US011816944B1

(12) United States Patent
Maney, Jr. et al.

(10) Patent No.: US 11,816,944 B1
(45) Date of Patent: *Nov. 14, 2023

(54) SYSTEMS AND METHODS FOR REMOTE CASH DEPOSIT SYSTEM

(71) Applicant: UIPCO, LLC, San Antonio, TX (US)

(72) Inventors: Will Kerns Maney, Jr., San Antonio, TX (US); Oscar Guerra, San Antonio, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,116

(22) Filed: Jul. 18, 2022

Related U.S. Application Data

(63) Continuation of application No. 17/084,712, filed on Oct. 30, 2020, now Pat. No. 11,423,729.

(60) Provisional application No. 62/928,433, filed on Oct. 31, 2019.

(51) Int. Cl.
*G07D 11/00* (2019.01)
*G06Q 20/10* (2012.01)
*G07C 9/00* (2020.01)
*G07D 11/125* (2019.01)
(Continued)

(52) U.S. Cl.
CPC ....... *G07D 11/0096* (2013.01); *G06Q 20/108* (2013.01); *G07C 9/00896* (2013.01); *G07D 11/125* (2019.01); *G07D 11/34* (2019.01); *G07D 11/50* (2019.01)

(58) Field of Classification Search
CPC ............ G07D 11/009; G07D 11/0093; G07D 11/0096; G07D 11/10; G07D 11/12; G07D 11/125; G07D 11/22; G07D 11/23; G07D 11/24; G07D 11/30; G07D 11/32; G07D 11/34; G07D 11/36; G07D 11/50
See application file for complete search history.

(56) References Cited

U.S. PATENT DOCUMENTS

| 9,460,469 B1 * | 10/2016 | Donaho ................. G06Q 40/02 |
| 2002/0185531 A1 | 12/2002 | Matzig |
| 2006/0253349 A1 | 11/2006 | Brooks, Jr. |

(Continued)

OTHER PUBLICATIONS

Non-Final Office Action dated Sep. 28, 2021 for U.S. Appl. No. 17/084,712.

(Continued)

*Primary Examiner* — Thien M Le
*Assistant Examiner* — April A Taylor
(74) *Attorney, Agent, or Firm* — Plumsea Law Group, LLC

(57) ABSTRACT

Secure cash deposit containers, such as secure cash bags or secure cash boxes equipped with an integrated bill scanner and a transmitter. The integrated bill scanner may receive and count the bills, and then store them in the secure cash deposit container. A transmitter in communication with the scanner may then transmit a report to the bank servicing the commercial establishment's cash deposit account. The bank may then automatically credit the amount reported by the scanner to the commercial establishment cash deposit account. The amount credited may be subject to further verification, for example, by a bank teller or by a bank's automated cash counting and sorting machines.

20 Claims, 8 Drawing Sheets

(51) Int. Cl.
    *G07D 11/34*        (2019.01)
    *G07D 11/50*        (2019.01)

(56) References Cited

U.S. PATENT DOCUMENTS

| | | |
|---|---|---|
| 2009/0006249 A1 | 1/2009 | Morgan |
| 2016/0210801 A1 | 7/2016 | Dobbins |
| 2017/0011599 A1 | 1/2017 | Bosch |

OTHER PUBLICATIONS

Ex Parte Quayle Office Action dated Dec. 17, 2021 for U.S. Appl. No. 17/084,712.

Notice of Allowance dated Apr. 18, 2022 for U.S. Appl. No. 17/084,712.

\* cited by examiner

SYSTEMS AND METHODS FOR REMOTE CASH DEPOSIT SYSTEM

CROSS-REFERENCE TO RELATED APPLICATIONS

This application is a Continuation of Maney, Jr. et al., U.S. Pat. No. 11,423,729, issued on Aug. 23, 2022, and titled "Systems and Methods for Remote Cash Deposit System," which claimed the benefit of United States Provisional Patent Application Ser. No. 62/928,433, filed Oct. 31, 2019, and titled "Systems and Methods for Remote Cash Deposit System." The disclosures of every application listed above are incorporated by reference in their entirety for all purposes.

TECHNICAL FIELD

This disclosure relates to the remote deposit of cash receipts by retailers, restaurants or other commercial establishments at their financial institutions.

BACKGROUND

Many commercial establishments such as retailers, restaurants, or entertainment venues, for example, routinely deposit their cash receipts at banks or other financial institutions at the end of their business day. Typically, the financial institution or bank might have closed at, for example, 5:00 pm, whereas the commercial establishments' business days may end much later in the evening or even after midnight. In those cases, the commercial establishments' cash receipts could be deposited in a bag drop at the financial institution or bank. The cash would then be counted the next business day, and would be credited to the commercial establishment at some later time or later date and added to the funds in the commercial establishments' accounts. Thus, in most of those cases, the funds would not be available for use by the commercial establishments for at least one day, and often for two, three or more days.

For those reasons, there is a need for a secure system for depositing commercial establishments' cash receipts in a more timely and effective manner, such that the cash receipts are promptly credited to the commercial establishments' accounts, and are available for withdrawal with only a short time delay.

SUMMARY

In one aspect, embodiments include a secure cash deposit container assigned to a commercial establishment. The secure cash deposit container has a bill scanner, an antenna electrically connected to a transmitter, an electronic circuit including a microprocessor and a transmitter module. It also has an electrical power source electrically connected to the scanner, the electronic circuit and the transmitter. The bill scanner is configured to scan bills fed into the bill scanner and to transmit information relating to the bills as scanned to a remote institution.

In another aspect, embodiments include a system for the prompt crediting of cash deposits being deposited by a commercial establishment. The system has a secure cash deposit container in communication with a remote device. The secure cash deposit container has an integrated scanner configured to scan paper currency as the paper currency is being inserted through the scanner into the secure cash deposit container. It also has an electronic circuit comprising modules for receiving identification of the paper currency that has been scanned by the integrated scanner. The electronic circuit is electrically connected to the integrated scanner. It also has a transmitter in electrical communication with the electronic circuit, and an antenna electrically connected to the transmitter for transmitting information relating to the paper currency that has been scanned by the integrated scanner to the remote device.

In yet another aspect, embodiments include method for a financial institution to provide prompt credit to its customers that have accounts at the financial institution. The method includes providing the customers with secure cash deposit containers, which have proprietary data that allows the secure cash deposit containers to communicate exclusively with the financial institution. The financial institution receives reports from the secure cash deposit containers regarding the amount of cash scanned into the secure cash deposit containers, and credits the customers' accounts with the amounts of cash reported by the secure cash deposit containers. The financial institution then confirms the amounts of cash being deposited by opening the secure cash deposit containers and counting the cash found in the containers, and comparing the amounts found in the secure cash deposit containers to the amounts reported by the secure cash deposit containers.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
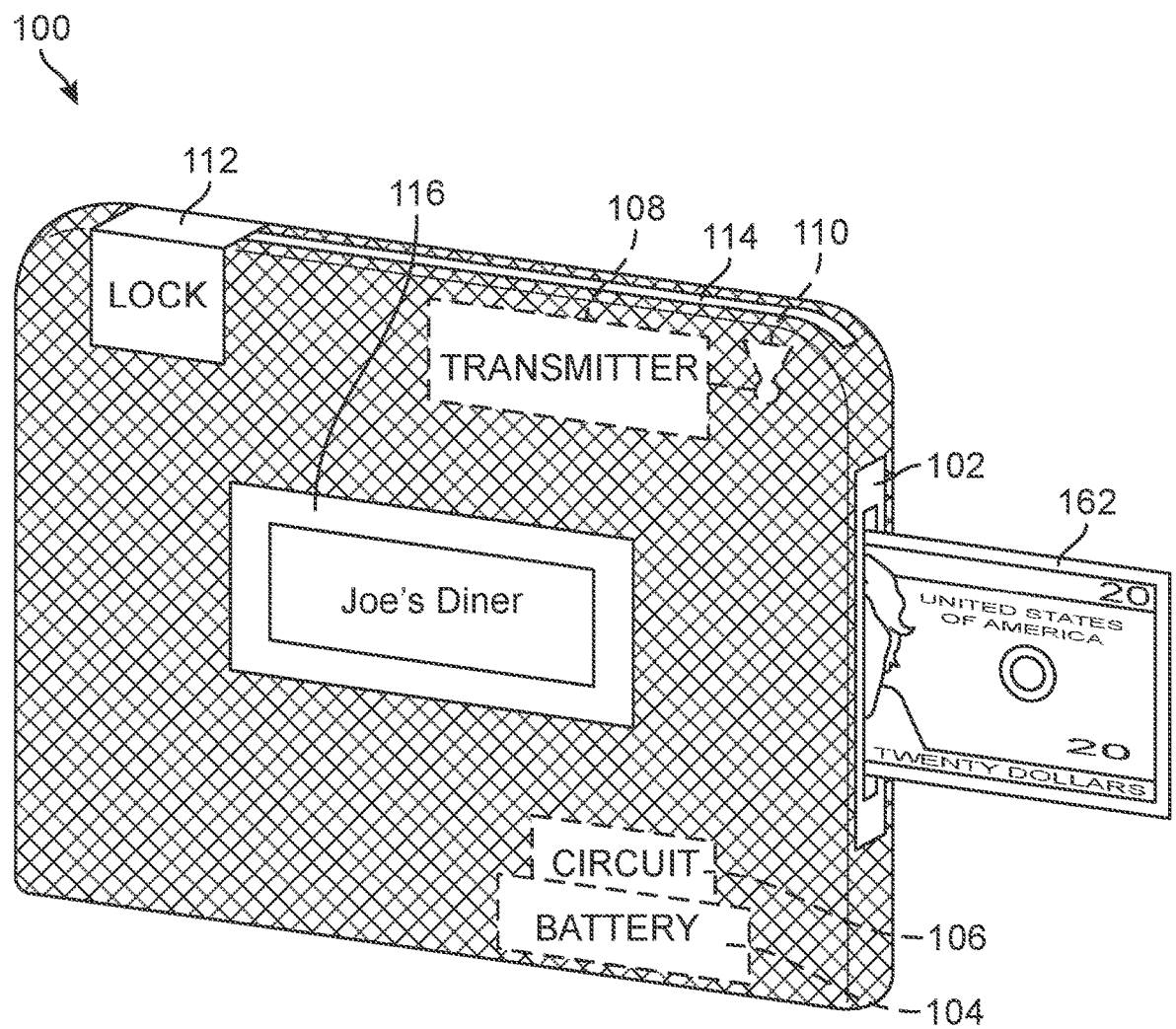
FIG. 1 is a schematic diagram representing a secure cash deposit bag, in an embodiment.

The embodiments disclosed herein provide an efficient and effective means for promptly crediting cash receipts, generally at the end of a business day, to commercial establishments. This allows the commercial establishments to have access to cash credited to their account much earlier than with the traditional "drop box" methods, in which the cash receipts were deposited in a drop box after the banks had closed, to be counted and credited to the commercial establishments' accounts on a subsequent day.

As used herein, the term "secure cash deposit container" shall refer to a secure cash deposit bag, secure cash deposit box or other suitable secure container that may be used to deposit cash receipts, for example, in a drop box. As used herein, the term "bank" shall refer to banks, credit unions, savings and loans and to any other type of financial institution where persons or businesses may have their accounts.

Briefly, the embodiments described herein may include using a secure container, such as a secure cash deposit bag, a secure cash deposit box or some other secure cash deposit container equipped with, for example, an integrated bill scanner and a transmitter. The integrated bill scanner may receive and count the bills, and then store them in the secure container. A transmitter in communication with the scanner may then transmit a report to the bank servicing the commercial establishment's cash deposit account. The bank may then automatically credit the amount reported by the scanner to the commercial establishment's cash deposit account. A trusted employee of the commercial establishment would then deposit the secure container into the bank's drop box for such cash deposits. In some cases, the amount credited may be subject to further verification, for example by a bank teller or by a bank's automated cash counting and sorting machines.

In the United States, the scanner may be programmed to recognize U.S. currency, such as $1, $2, $5, $10, $20, $50, $100 bills or more. It may also be programmed to recognize Canadian and/or Mexican currency, for example at establishments near the United States' northern or southern borders. However, the scanner may also be programmed to reject large denomination bills, such as $1,000 bills. In other jurisdictions, the scanners may be programmed to recognize and process the local paper currency, as well as currency used by frequent or common visitors to the area.

This process ensures that the retailer, restaurant, entertainment venue or other commercial establishment receives credit for its cash deposits almost immediately at the end of the business day, or, in any event, one day or possibly several days sooner than it would have if it had used the traditional drop-box method. This provides the owner of the commercial establishment with much earlier access to the funds in his, her or its accounts. Having such early access is especially important for small businesses that may need such access in order to meet their payroll and other obligations.

FIG. 1 is a schematic diagram of a secure cash deposit bag 100 equipped with an integrated scanner 102. Secure cash deposit bag 100 may receive paper currency 162 (such as, in the example shown in FIG. 1, a U.S. $20 bill) as that currency is fed through its integrated scanner 102. Integrated scanner 102 may be powered by an internal battery 104, as shown in FIG. 1, or it may receive its electrical power from the power grid or from an external battery (not shown), for example. Secure cash deposit bag 100 may also include an electronic circuit 106, a transmitter 108 and an antenna 110. The electronic circuit and the transmitter may receive their electrical power from internal battery 104, or from an external power source. Label 116 identifies the business that is making the deposit; in the example shown in FIG. 1, Joe's Diner is the business making the deposit. Secure cash deposit bag 100 may be opened using, for example, a zipper 114.

The zipper 114 on secure cash deposit bag 100 also has a lock 112, which may be a mechanical lock that can only be opened with a key, or it may be an electronic lock (typically powered by battery 104, although it may have its own internal battery) that may only be opened by entering a sequence of numerals, letters or other characters on a keypad. It may alternatively be a combination of a mechanical lock and an electronic lock. In the latter case, the bank may only have the code for opening the secure cash deposit bag using the keypad, while the business owner has the key to the mechanical lock, or vice-versa. If lock 112 is opened, or not operational for any reason, then the integrated scanner would not report any cash that may have been scanned, and will not scan any more bills into the secure cash deposit bag 100. In any event, if the secure cash deposit bag is opened for any reason before it reaches the bank, the bank would be alerted via the secure cash deposit bag's transmitter and any amount credited would be reversed until a bank employee can verify the amount of cash received in the secure cash deposit bag.

In some cases, the lock can only be opened when the secure cash deposit container is actually physically present in a facility within the bank or other financial institution. For example, the lock may be opened only for a limited time after it receives a command from a computer or other device within the financial institution, which would then allow an employee of the financial institution to enter a password or code to open the lock.

Figure 2:
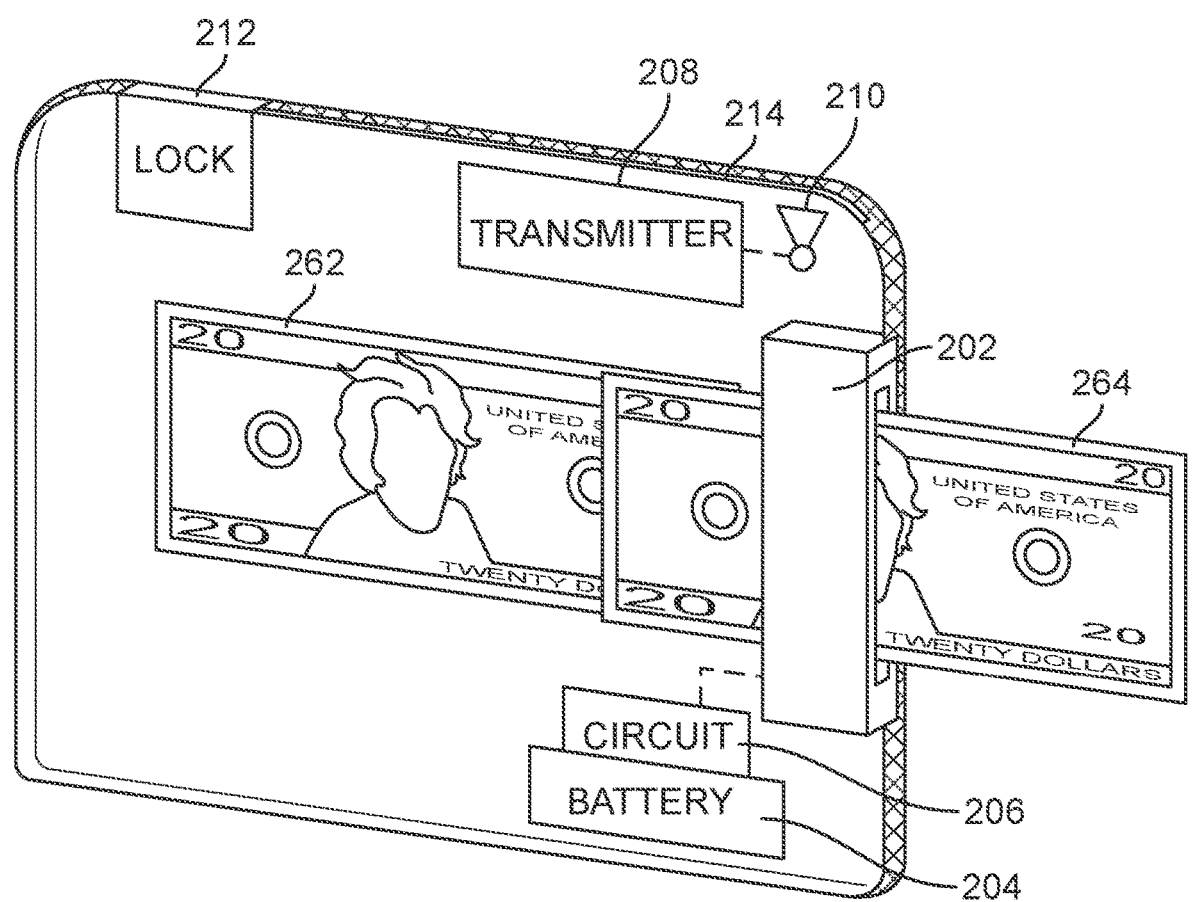
FIG. 2 is a schematic diagram of a cross-section of the secure cash deposit bag of FIG. 1.

FIG. 2 is a schematic diagram 200 of a longitudinal vertical cross-section of a secure cash deposit bag, showing its integrated scanner 202, electronic circuit 206, battery, 204, transmitter 208, antenna 210, zipper 214 and lock 212. In this example, the secure cash deposit bag already has at least one paper currency bill 262 (in this example, a U.S. $20 bill) in the secure cash deposit bag. When another paper currency bill 264 (again, in this example a U.S. $20 bill) is fed into the secure cash deposit bag via integrated scanner 202, as shown in FIG. 2, integrated scanner 202 identifies the currency (U.S., Canadian, Mexican or other), the denomination ($1, $2, $5, $10, $20, $50, $100 or other) of the currency, and then totals up the value of the currency that has been scanned in. In many cases, the integrated scanner keeps a cumulative running total of the amount of currency scanned in. Any bill that was not recognized by the integrated scanner, whether that was because the bill was damaged, was dirty, or was from a currency or denomination that integrated scanner did not recognize, would be rejected. For example, as shown in the examples of FIG. 1 and FIG. 2, a $20 U.S. bill 162 (shown in FIG. 1), a $20 U.S. bill $262 (shown in FIG. 2) or a $20 U.S. bill 264 (shown in FIG. 2) have been scanned (U.S. bill 262) or is being scanned (U.S. bill 162 shown in FIG. 1 and U.S. bill 264 shown in FIG. 2).

Figure 3:
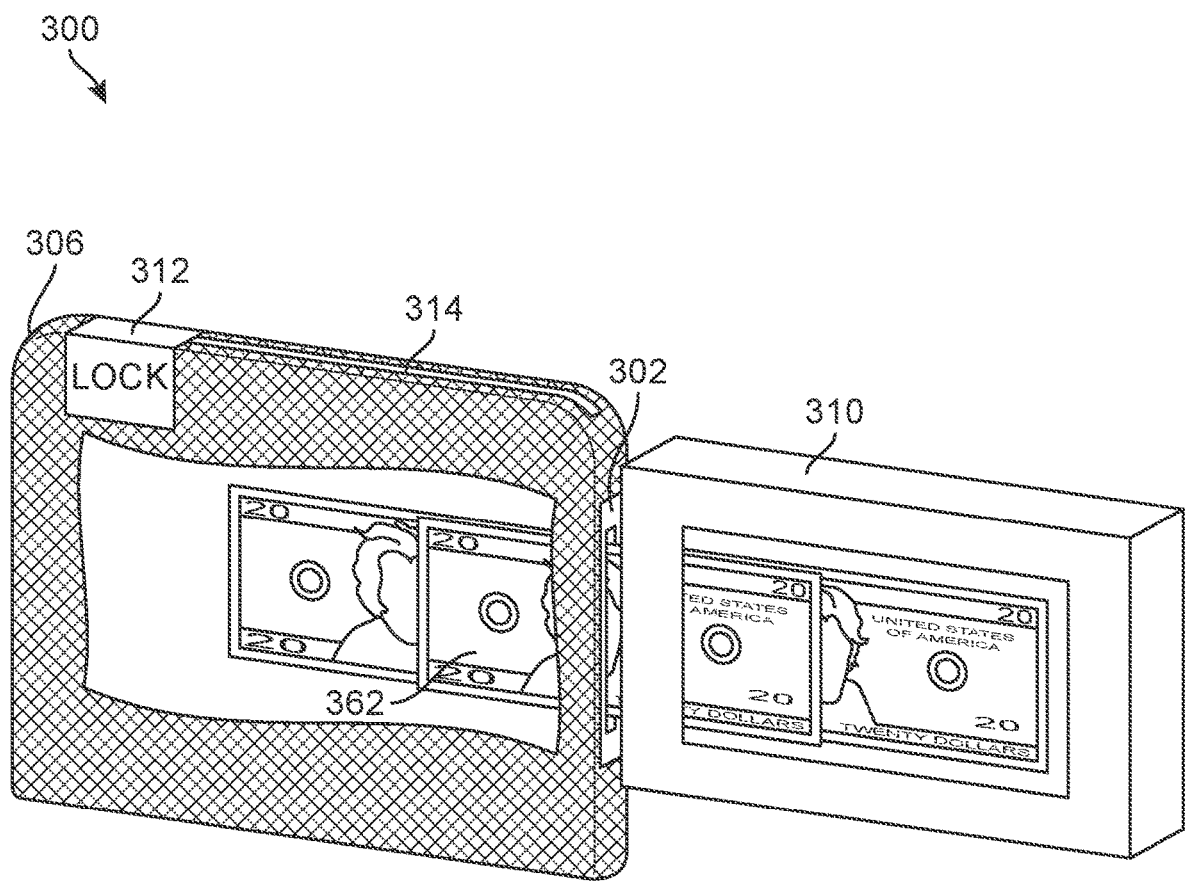
FIG. 3 is a schematic diagram of the secure cash deposit bag of FIG. 1, locked onto an automatic bill feeder, in an embodiment.

Many commercial establishments may prefer to use a bill feeder to feed bills into the integrated scanner, instead of having an employee feed the bills in manually. Thus, as shown in the schematic diagram 300 of FIG. 3, a bill feeder 310 may be used to feed paper currency (in this example, a U.S. 20 bill 362, partially shown via the cutout in the side of the bill feeder) into integrated scanner 302 in secure cash deposit bag 306. Bill feeder 310 may be locked onto integrated scanner 302. During this process, the zipper 314 of secure cash deposit bag 306 remains locked by lock 312. If lock 312 is opened, or not operational for any reason, then the integrated scanner will not report any cash that may have been scanned, and will not scan any more bills into the secure cash deposit bag 306.

Figure 4:
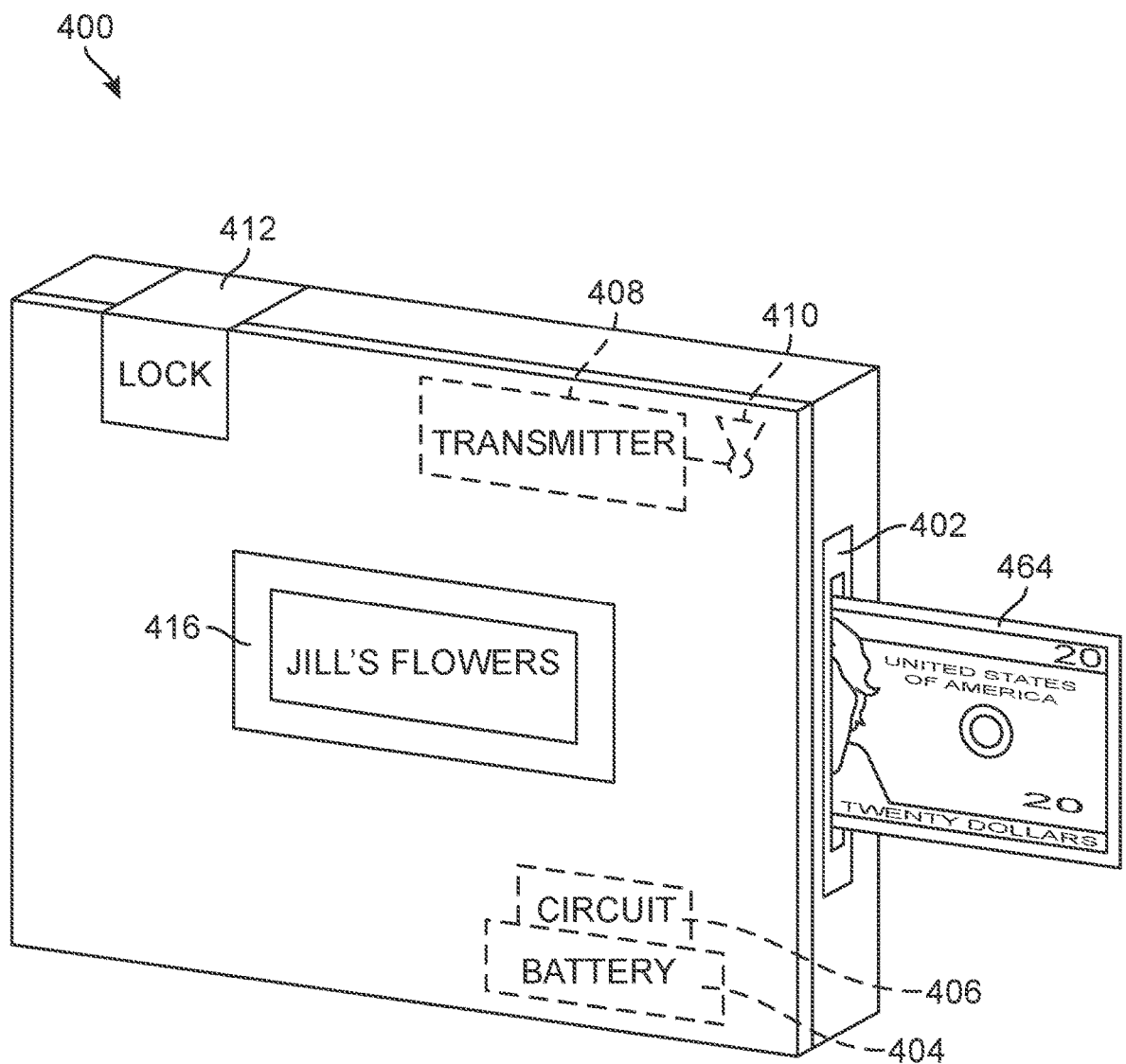
FIG. 4 is a schematic diagram of a secure cash deposit box, in an embodiment.

FIG. 4 illustrates another embodiment of a secure cash deposit container, in this case a secure cash deposit box 400. Secure cash deposit box 400 has an integrated scanner 402, a transmitter 408, an antenna 410, an electronic circuit 406, a battery 404, and a lock 412. A label 416 on one side of the secure cash deposit box 400 identifies the commercial establishment making the deposit, in this example, "Jill's Flowers." Secure cash deposit box 400 may receive paper currency 464 as that currency is fed through its integrated scanner 402. Integrated scanner 402 may be powered by an internal battery 404, as shown in FIG. 4, or it may receive its electrical power from the power grid or from an external battery (not shown), for example. Secure cash deposit box 400 may also include an electronic circuit 406, a transmitter 408 and an antenna 410. The electronic circuit and the transmitter may receive their electrical power from internal battery 404, or from an external power source. Like the secure cash deposit bag shown in FIG. 1 and FIG. 2, the paper currency is scanned into secure cash deposit box 400, and a report of the bills scanned in and their values would be reported to the commercial establishment's bank for deposit in the commercial establishment's bank account.

In many cases, when all the paper currency has been fed through the scanner into the secure cash deposit container, the bill feeder issues a prompt to the secure cash deposit container instructing the secure cash deposit container to transmit the information relating to the cash deposit (such as the identity of the customer and the amount of cash being deposited) to the financial institution for deposit to the commercial establishment's account. If a bill feeder is not used, the prompt may be issued after a predetermined waiting period (such as five or ten minutes) after the last bill has been scanned in, or when the person feeding the bills into the secure cash deposit container presses a button or switch or otherwise physically causes a prompt to be sent to the cash deposit container instructing the secure cash deposit container to transmit information relating to the cash deposit (such as the total amount of the cash deposited and the identity of the customer) to the financial institution for deposit.

Figure 5:
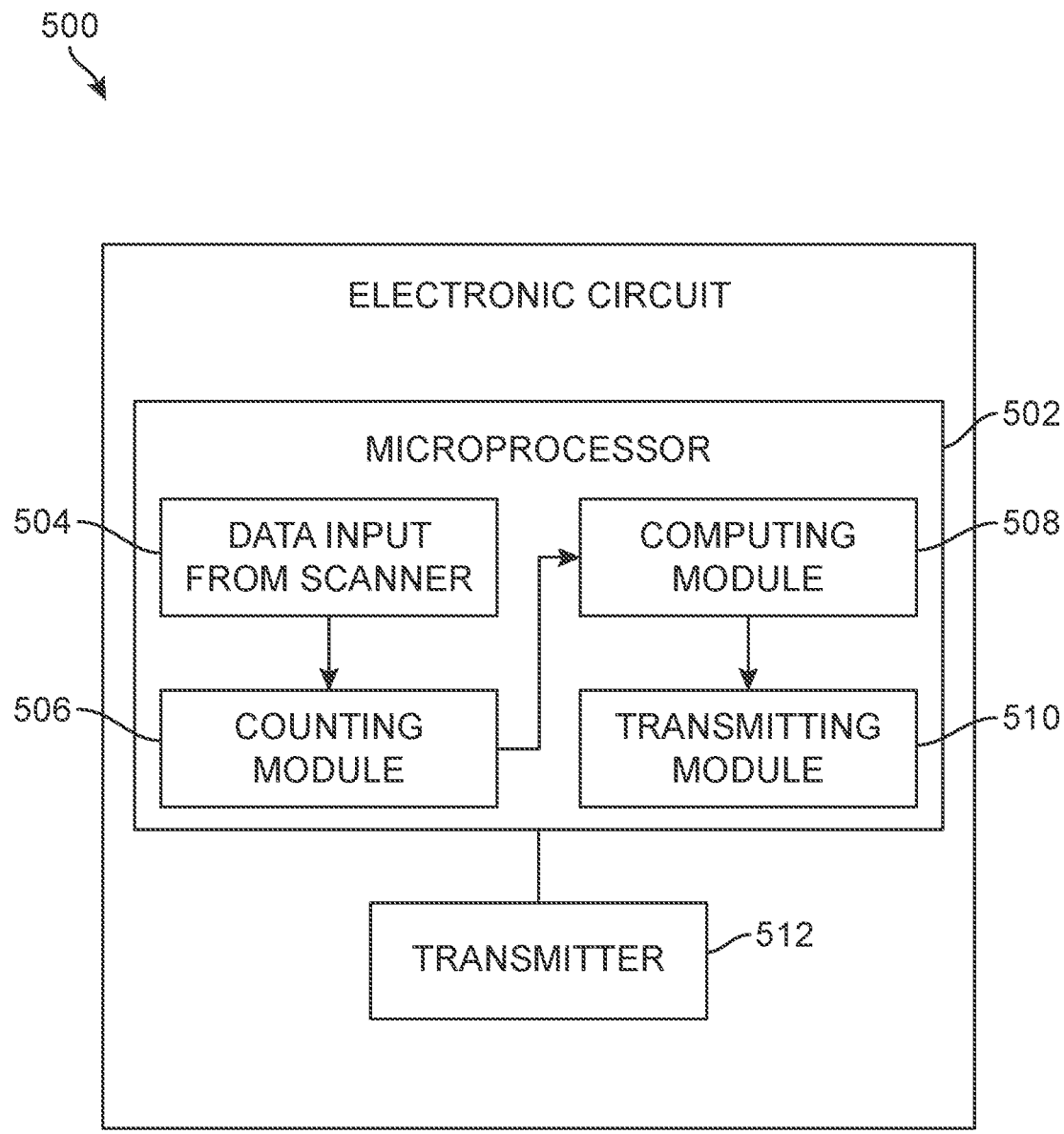
FIG. 5 is a schematic block diagram of modules that may be used by an electronic circuit to implement the processes used to count and remotely deposit cash receipts, in an embodiment.

FIG. 5 is a schematic block diagram of an exemplary electronic circuit that may be used in a secure cash deposit bag, a secure cash deposit box or other secure cash deposit container. In this example, electronic circuit 500 has a microprocessor 502 and a transmitter module 512. Microprocessor 502 has a data input module 504 that receives the cumulative data as it is provided by the integrated scanner, such as integrated scanner 202 shown in FIG. 2 or integrated scanner 402 shown in FIG. 4. Thus the microprocessor may store the cumulative amount of deposited cash as it is scanned into the secure cash deposit container. Microprocessor 502 may also have a counting module 506 that identifies and counts the paper currency as it is scanned in. In some embodiments, the integrated scanner may identify the paper currency and also keep a running summary and cumulative total of the paper currency that has been received. In such embodiments, the counting module 506 may be omitted, although it may nevertheless be used as a double check on the operation of the integrated scanner. In embodiments wherein the scanner only identifies the paper currency, counting module 506 counts the bills received and notes their respective values. Computing module 508 then totals up the value of the cash being deposited, and transmitting module 510 transmits the results, including the cumulative cash amount, to transmitter module 512 via a transmitter such as transmitter 108 in FIG. 1, transmitter 208 in FIG. 2 or transmitter 408 in FIG. 4. The transmitter then transmits a report over an antenna such as antenna 110 in FIG. 1, 210 in FIGS. 2 and 410 in FIG. 4 to the commercial establishment's bank so that the cash can be credited to the commercial institution's account at the bank as soon as possible. In many cases, the bank may respond to electronic circuit 500 confirming that it has received the transmission. In some cases, the microprocessor encodes the information in the report prior to transmitting the report to the commercial establishment's bank.

Figure 6:
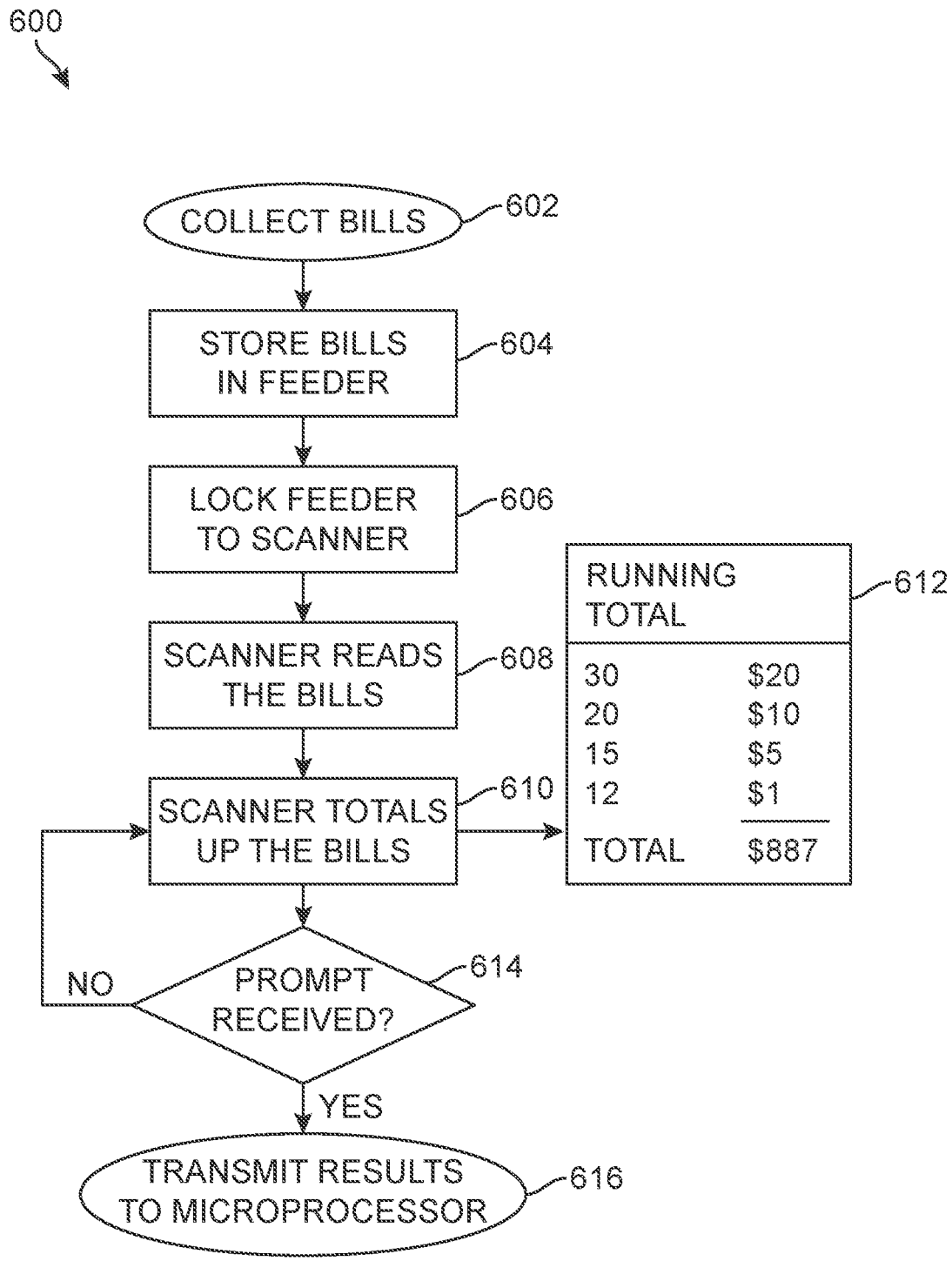
FIG. 6 is a flow chart showing steps that may be used to load cash receipts using a bill feeder, in an embodiment.
Figure 7:
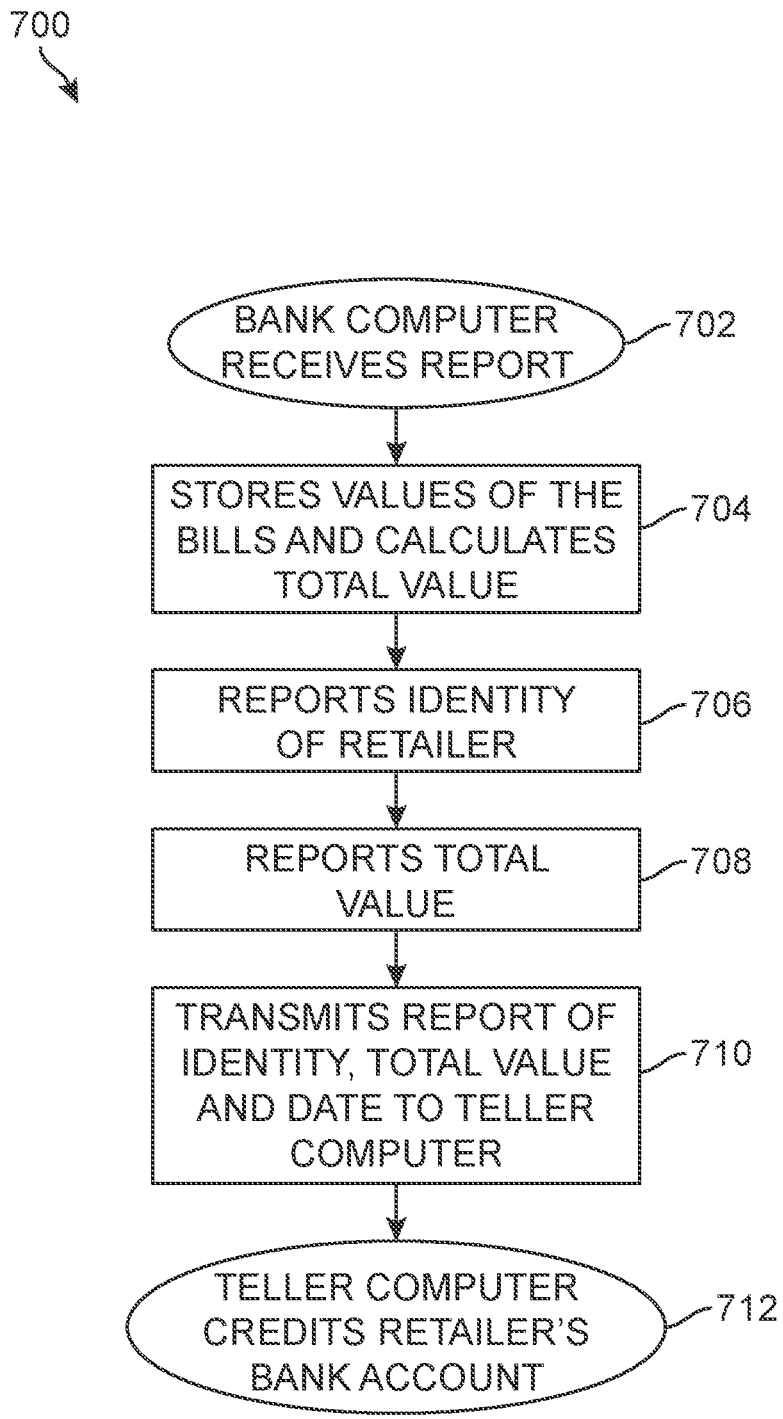
FIG. 7 is a flow chart showing the steps that may be taken by a bank computer when receiving a cash deposit report, in an embodiment.
Figure 8:
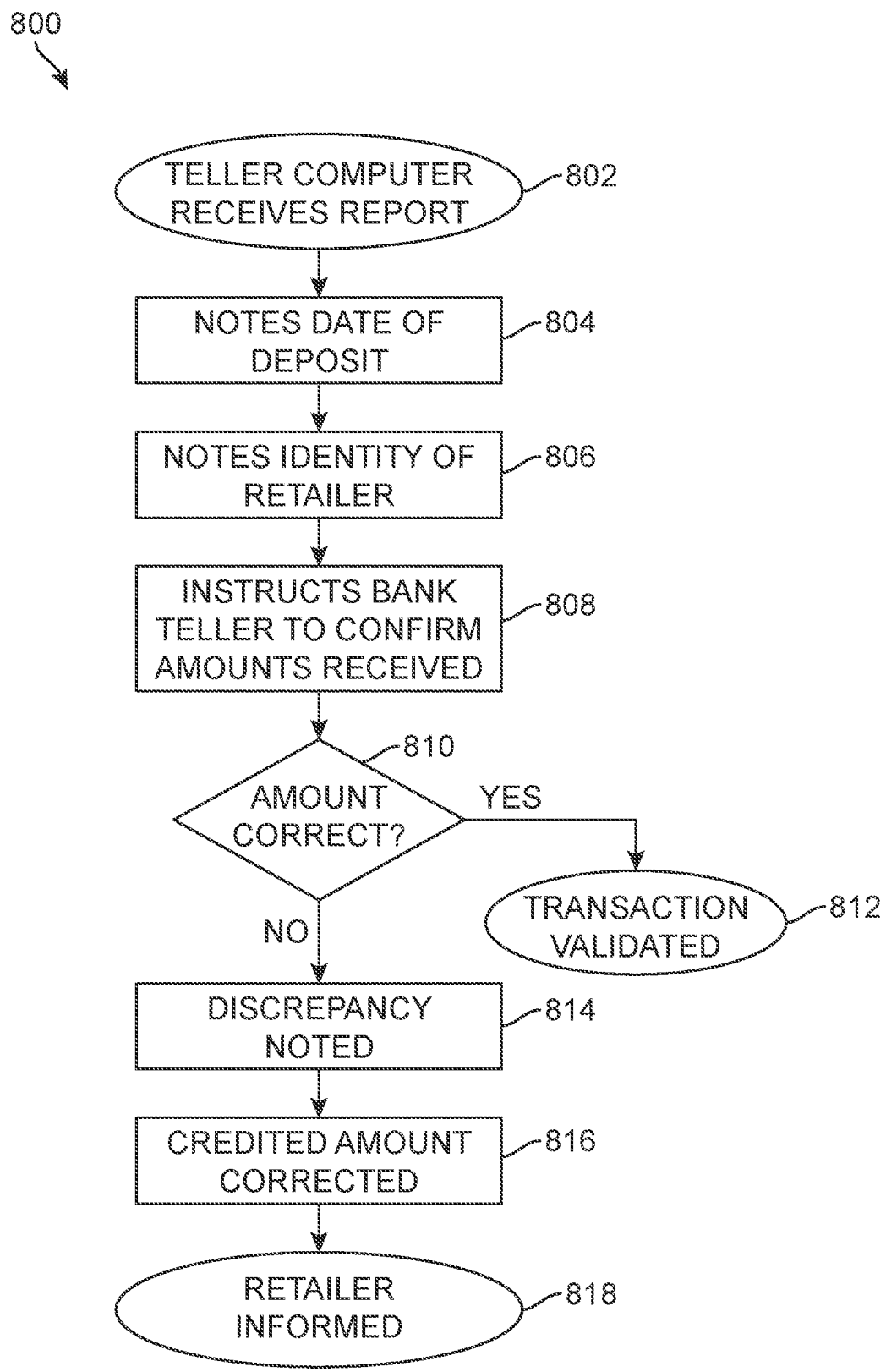
FIG. 8 is a flow chart showing the steps that may be taken by a teller computer to verify the cash receipts, and to credit the amount to the commercial establishment's account, in an embodiment.

FIG. 6, FIG. 7 and FIG. 8 are flow charts showing examples of processes that may be used by the integrated scanner (either for the secure cash deposit bag or the secure cash deposit box) to collect and count the bills, and to report the results to the bank (FIG. 6), to receive the report from the scanner, store the results and transmit the identity of the commercial establishment and the value of the cash deposits (FIG. 7) and to confirm the accuracy of the report and validate the deposit (FIG. 8).

Thus FIG. 6 is an exemplary flow chart 600 outlining the steps that may be taken to transmit a report to the commercial establishment's bank summarizing the cash being deposited. After the bills have been collected from the cash drawer or cash drawers at the commercial establishment in step 602, the bills may be stored in a bill feeder in step 604, if a bill feeder is being used, and the bill feeder may be locked or otherwise connected to an integrated scanner in step 606. If a bill feeder is not being used, the bills may be manually inserted into the integrated bill scanner, such that steps 604 and 606 would not be executed. The scanner then reads the bills in step 608 and optionally totals up the bills in optional step 610. In any event, the scanner may keep a running cumulative record 612 of the bills as they are scanned in. In step 614, the scanner determines if it has received a prompt indicating whether all the bills in the bill feeder have been scanned. If the prompt is not received, the process returns to step 610 (if that optional step is being used) or to step 608 if optional step 610 is not being used. Eventually, step 614 determines that a prompt has been received indicating that there are no more bills to be scanned, and the results are transmitted in step 616 to the electronic circuits transmitting module 510 (shown in FIG. 5) for transmittal to the commercial establishment's bank via transmitter module 512 (shown in FIG. 5).

FIG. 7 is a flowchart 700 showing an example of the steps that may be taken at the commercial establishment's bank to receive the report from the scanner and to credit the commercial establishment's bank account. In step 702, the bank's intake computer receives the report from the transmitter module 512 (shown in FIG. 5). In step 704, the bank's intake computer stores the values of the bills and calculates the total value of the cash being deposited via a secure cash bag or a secure cash box or other secure cash container. In steps 706 and 708 the bank's intake computer reports the identity of the retailer (or other commercial establishment) and the total value of the cash being deposited. In step 710 the bank's intake computer transmits a report of the identity of the retailer (or other commercial establishment) and the date of the deposit to, for example a teller computer. It may alternatively transmit this data to a teller module within the bank's intake computer. Finally, the teller computer (or the teller module within the bank's intake computer) credits the cash deposit to the retailer's (or other commercial establishment's) bank account in step 712.

After the secure cash receipt container (such as a secure cash receipt bag, a secure cash receipt box or other secure cash receipt container) is deposited in the commercial establishment bank's drop box, the bank needs to confirm that the amount received corresponds to the amount reported. FIG. 8 is a flowchart 800 showing an example of the steps that may be taken by the teller computer (or teller computer module in the bank's intake computer) in the commercial establishment's bank to confirm that the correct amount has been reported.

In step 802, the teller computer receives the report from the bank's intake computer. The teller computer then notes the date of the deposit in step 804 and the identity of the retailer, restaurant or other commercial establishment in step 806. The teller computer then instructs a bank teller to confirm that the amounts received tally correctly with the amounts reported by the secure cash receipt container in step 808. When the secure cash receipt container is retrieved from the drop box, in step 810 a bank teller then opens the secure cash deposit container and compares the amount received in the secure cash receipt container to the amount reported by secure cash receipt container. Once the secure cash deposit container has been opened, the cumulative total stored in the secure cash deposit container may be reset to zero. The bank teller may count the bills manually or use an automated bill counter. If the amount reported is correct, the transaction is validated in step 812 and no corrective action need be taken. If the amount is not correct, the discrepancy is noted in step 814, the amount credited to the retailer, restaurant or other commercial establishment is corrected in step 816, and the retailer, restaurant or other commercial establishment is informed of the correction in step 818.

In many cases, the secure cash deposit container may be provided by a financial institution to certain of its commercial customers, as an additional service that would allow prompt crediting of cash deposits for the commercial customers. In those cases, the secure cash deposit containers might be owned by the financial institution rather than by the commercial establishment. To ensure greater security, the secure cash deposit containers may be configured such that they could only be opened when they are physically present at the financial institution, for example when the secure cash deposit container is opened on the next business day.

The secure cash deposit container might be keyed to the financial institution in one or more of several ways. For example, the transmission of the amount of cash, the bill denominations and the identity of the commercial establishment making the deposit could be executed using the financial institution's own proprietary data, such as confidential protocols and passwords. Such proprietary and confidential protocols and passwords could have been stored and locked in within the secure cash deposit container's microprocessor, such that they could not be interrogated by any potential wrongdoer. In another example, the lock on the secure cash deposit container may be an electronic lock that could only be opened on the financial institution's premises by an employee entrusted with the code for opening the lock.

In some cases, the financial institution may set maximum limits as to how much cash may be remotely credited to the customer's account until the secure cash deposit container is opened and the actual amount being deposit is confirmed. For example, a new customer may only be allowed a remote credit of $100, $250 or $500 for an introductory time. After a regular history of accurate cash deposit reporting has been established, the allowed amounts that could be credited may be increased, for example, to $500, $1,000, $2500 or $5,000.

The secure cash deposit containers described above may also be used to deliver other types of valuable documents, such as checks, letters of credit, stocks, bonds or other financial documents, either to a financial institution or to some other recipient. The images of the documents of the documents could be recorded as they are scanned in, and those images could then be transmitted to the financial institution or the other recipient. Any discrepancy between the scanned-in documents and the actually physically received documents could then be detected. This might make it easier to identify and track down any missing documents, and/or to identify where in the chain of transfer of the documents a document might have disappeared.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A secure cash deposit container assigned to a commercial establishment for receipt of funds by a financial institution, comprising:
   a bill scanner;
   an antenna electrically connected to a transmitter;
   an electronic circuit comprising a microprocessor and a transmitter module; and
   an electrical power source electrically connected to the scanner, the electronic circuit and the transmitter;
   wherein the bill scanner is configured to scan bills fed into the bill scanner and to transmit information relating to the bills as scanned to the financial institution using confidential protocols stored in the microprocessor of the secure cash deposit container;
   wherein the secure cash deposit container further comprises a lock that is opened only after the secure cash deposit container receives a command from a device in the financial institution confirming that the secure cash deposit container is physically present in the financial institution.

2. The secure cash deposit container of claim 1, wherein the secure cash deposit container is one of a secure cash deposit bag and a secure cash deposit box.

3. The secure cash deposit container of claim 1, wherein the receiving of the command is followed by receiving a password to unlock the lock at the physical premises of the financial institution.

4. The secure cash deposit container of claim 1, wherein the microprocessor encodes the information relating to the bills as scanned prior to the transmission of the information to the financial institution.

5. The secure cash deposit container of claim 1, wherein the microprocessor calculates a cumulative cash amount as the bills are scanned into the secure cash deposit container.

6. The secure cash deposit container of claim 1, wherein the secure cash deposit container is in wireless communication with the financial institution.

7. The secure cash deposit container of claim 1, wherein the information relating to the bills includes at least one of an identity of the commercial establishment and an account number of one of the commercial establishment's accounts at the financial institution.

8. A system for the prompt crediting of cash deposits being deposited by a commercial establishment for receipt by a financial institution, comprising:
   a secure cash deposit container in communication with a remote device at the financial institution, the secure cash deposit container comprising:
      an integrated scanner configured to scan paper currency as the paper currency is inserted through the scanner into the secure cash deposit container;

an electronic circuit comprising modules for receiving identification of the paper currency that has been scanned by the integrated scanner, said electronic circuit being electrically connected to the integrated scanner;

a transmitter in electrical communication with the electronic circuit;

an antenna connected to the transmitter for transmitting information relating to the paper currency that has been scanned by the integrated scanner to the remote device at the financial institution; and a lock that is opened only after the secure cash deposit container receives a password to unlock the lock at the physical premises of the financial institution;

wherein the electronic circuit comprises a microprocessor, and the microprocessor calculates a cumulative cash amount as the paper currency is being scanned;

wherein the cumulative cash amount is verified using an automatic bill counter and a deposit is then validated;

wherein the cumulative cash amount is reset to zero when the secure cash deposit container is opened, the cumulative cash amount is verified, and the deposit is validated.

9. The system for the prompt crediting of cash deposits of claim 8, further comprising receiving a command from a device in the financial institution confirming that the secure cash deposit container is physically present in the financial institution before the receiving of the password.

10. The system for the prompt crediting of cash deposits of claim 8, wherein the integrated scanner is programmed to reject large denomination bills.

11. The system for the prompt crediting of cash deposits of claim 8, wherein the microprocessor encodes the information relating to the paper currency prior to transmitting the information to the remote device at the financial institution.

12. The system for the prompt crediting of cash deposits of claim 8, wherein only a portion of the cumulative cash amount is available for withdrawal until the cumulative cash amount is verified and the deposit is validated.

13. The system for the prompt crediting of cash deposits of claim 12, wherein an amount of the portion of the cumulative cash amount is based on a history of accurate cash deposit reporting by a depositor.

14. The system for the prompt crediting of cash deposits of claim 8, wherein the remote device at the financial institution is associated with the financial institution, and wherein an identity of the commercial establishment is included in the information relating to the paper currency that is transmitted to the remote device at the financial institution.

15. A method for a financial institution to provide prompt credit to its customers, the customers having customer accounts at the financial institution, comprising:

providing the customers with secure cash deposit containers;

receiving reports from the secure cash deposit containers regarding any amounts of cash scanned into the secure cash deposit containers;

crediting the customers' accounts with the amounts of cash reported by the secure cash deposit containers; and confirming the amounts of cash being deposited by opening the secure cash deposit containers and automatically counting the cash found therein, and comparing the amounts found in the secure cash deposit containers to the amounts reported by the secure cash deposit containers;

wherein the secure cash deposit containers each comprise a lock that is opened only after the secure cash deposit container receives a command from a device in the financial institution confirming that the secure cash deposit container is physically present in the financial institution;

wherein each lock detects tampering and stops the counting the cash found therein when the tampering is detected.

16. The method of claim 15, wherein the secure cash deposit containers comprise proprietary data that allows the secure cash deposit containers to communicate exclusively with the financial institution.

17. The method of claim 15, wherein the crediting comprises crediting portions of the amounts of cash prior to the confirming the amounts of cash being deposited and crediting remainders of the amounts of cash after the confirming the amounts of cash being deposited.

18. The method of claim 15, wherein the cash is in at least one of U.S., Canadian, and Mexican denominations.

19. The method of claim 15, wherein opening the lock further comprises receiving a password to unlock the lock at the physical premises of the financial institution.

20. The method of claim 15, wherein the secure cash deposit containers are in wireless communication with the financial institution.

* * * * *